(12) United States Patent
Knobloch

(10) Patent No.: US 8,780,132 B1
(45) Date of Patent: Jul. 15, 2014

(54) ENHANCED ASSIMILATION OF ORIENTATION-DEPENDENT DATA IN A MULTIDIMENSIONAL DATA VOLUME

(76) Inventor: Charles Saron Knobloch, Katy, TX (US)

( * ) Notice: Subject to any disclaimer, the term of this patent is extended or adjusted under 35 U.S.C. 154(b) by 576 days.

(21) Appl. No.: 12/728,234

(22) Filed: Mar. 21, 2010

Related U.S. Application Data

(60) Provisional application No. 61/162,262, filed on Mar. 21, 2009.

(51) Int. Cl.
*G09G 5/02* (2006.01)

(52) U.S. Cl.
USPC .......................................... 345/589; 345/593

(58) Field of Classification Search
USPC ............... 345/419–424, 589–605; 702/14–18
See application file for complete search history.

(56) References Cited

U.S. PATENT DOCUMENTS

| | | | | |
|---|---|---|---|---|
| 5,930,730 | A * | 7/1999 | Marfurt et al. | 702/16 |
| 6,584,409 | B2 * | 6/2003 | Wisecup | 702/14 |
| RE38,229 | E * | 8/2003 | Marfurt et al. | 702/16 |
| 6,885,943 | B2 * | 4/2005 | Bittar et al. | 702/7 |
| 6,920,084 | B2 * | 7/2005 | MacKay | 367/53 |
| 2004/0174357 | A1 * | 9/2004 | Cheung et al. | 345/419 |
| 2006/0122780 | A1 * | 6/2006 | Cohen et al. | 702/14 |

* cited by examiner

*Primary Examiner* — Xiao Wu
*Assistant Examiner* — Charles Tseng

(57) ABSTRACT

Provided herein is a method for enhanced visualization including the steps of: inputting a 3-D data set, encoding data values with dip information from a plurality of orientations, providing a color look-up table that displays subsets of the encoded data outcomes for each orientation, selecting a color look-up table to use is response to the viewing-orientation of the data set, and displaying the data set in a given orientation using the selected color look-up table. An apparatus and system of the present invention is realized through a computer program or system coded based upon the method disclosed.

20 Claims, 2 Drawing Sheets

0° View

90° View

Figure 1:
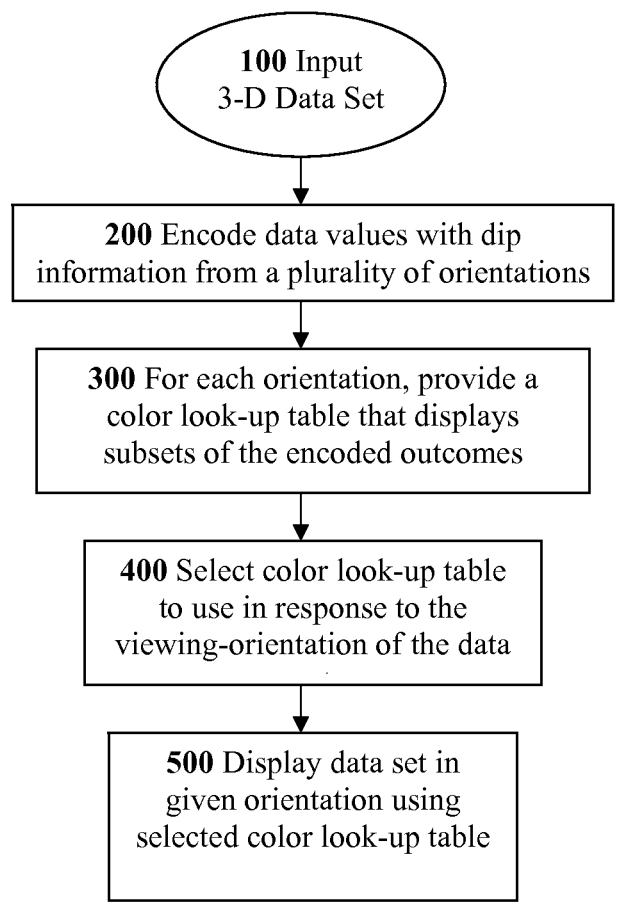

ENHANCED ASSIMILATION OF ORIENTATION-DEPENDENT DATA IN A MULTIDIMENSIONAL DATA VOLUME

FIELD OF THE INVENTION

The present invention relates generally to the use of color displays for displaying selected characteristics of geoscience features, and more particularly relates to a method for displaying multiple characteristics of multidimensional geoscience data and, more particularly, to the use of color displays in order to visualize simultaneously changing out-of-plane features on plane slices extracted from a multidimensional data volume.

BACKGROUND

The progress of science has made it possible to gather seismic data that is able to reveal information about the geology layers below the surface of the earth that can help the oil industry make decisions on where to drill. Seismic data has been traditionally acquired and processed for the purpose of imaging seismic reflections. A multidimensional data volume represents the seismic data obtained from geoscience surveys. There are a multitude of characteristics, or attributes, that may be associated with any data point in the multidimensional geoscience data volume. For many of these characteristics or attributes, the data is dependant upon the viewing-orientation. To display such data would require massive computer resources and complex software to process. Thus, there is a need to develop a method to display and present orientation-dependent data without requiring massive amounts of computing on the multidimensional data volume.

Use of color to present and display multiple characteristics of seismic data is known in the art. However, there is still a need for presenting and displaying out-of-plane dip features simultaneously with a plane slice from a multidimensional data volume. However, the out-of-plane dip is not a constant value at any given x, y, z location, as its value is dependent upon the viewing-orientation.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within this written description.

SUMMARY OF THE INVENTION

In a first example of the present invention, a method is disclosed for displaying multiple characteristics of multidimensional geoscience data volumes in one presentation by using color features. An orientation-dependent attribute is selected. Two or more orientations are selected for use in displaying the attribute. The value for the attribute is categorized into two or more conditions or states. A color look-up table is created or used for each orientation. A value in each color look-up table is assigned for each unique combination of orientation and condition. A color is assigned to each value in the color look-up table, based upon the orientation for that color look-up table and the condition (or state) for that attribute data value. The color look-up table values are placed in a multi dimensional data volume, each color look-up table value representing the unique combination of orientation-dependent states for that attribute value at that location in the volume. Upon display of the data volume, or a slice of the data volume, the color look-up table that is used is based upon the viewing-orientation. As the viewing-orientation of the data volume, or slice, is changed, a different color look-up table is applied, changing the display of the orientation-dependent attribute.

In another example, the method includes the steps of: inputting a 3-D data set, encoding data values with dip information from a plurality of orientations, providing a color look-up table that displays subsets of the encoded data outcomes for each orientation, selecting a color look-up table to use in response to the viewing-orientation of the data set, and displaying the data set in a given orientation using the selected color look-up table.

In another example, the method includes: categorizing an orientation dependent data attribute into two or more classes; categorizing a viewing orientation into two or more classes; establishing a color lookup table for the viewing-orientation classes, the color lookup table having a lookup value for each combination of orientation-dependent class and viewing-orientation class; and assigning a lookup value to at least one data value in a data set, the lookup value corresponding to the classified orientation-dependent data attributes for the data value.

This technique can be applied to any viewing-orientation dependent data, and not just the dip information. For example, bedding curvature or even coherence is used as the viewing-orientation-dependent data. For example, pre-stack data or information from pre-stack data is used. For example, geologic data or interpretations are used.

It can be appreciated that the present invention can be realized through a computer program or system that is coded based upon the method disclosed. Further, the resulting displays represent a useful and new product or apparatus. In one example, in a computer programmed to produce images representative of a data set, an article of manufacture includes: a medium that is readable by a computer and that carries instructions for the computer to perform a process including: categorizing an orientation dependent data attribute into two or more classes; categorizing a viewing orientation into two or more classes; establishing a color lookup table for the viewing-orientation classes, the color lookup table having a lookup value for each combination of orientation-dependent class and viewing-orientation class; and assigning a lookup value to at least one data value in the data set, the lookup value corresponding to the classified orientation-dependent data attributes for the data value. In another example, a computer generated display prepared from a process includes the steps of: categorizing an orientation dependent data attribute into two or more classes; categorizing a viewing orientation into two or more classes; establishing a color lookup table for the viewing-orientation classes, the color lookup table having a lookup value for each combination of orientation-dependent class and viewing-orientation class; and assigning a lookup value to at least one data value in the data set, the lookup value corresponding to the classified orientation-dependent data attributes for the data value.

BRIEF DESCRIPTION OF THE DRAWINGS AND TABLES

Figure 2:
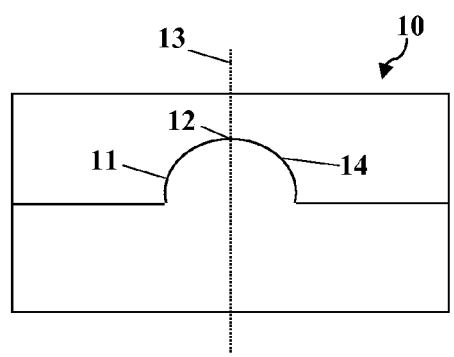
Figure 2:
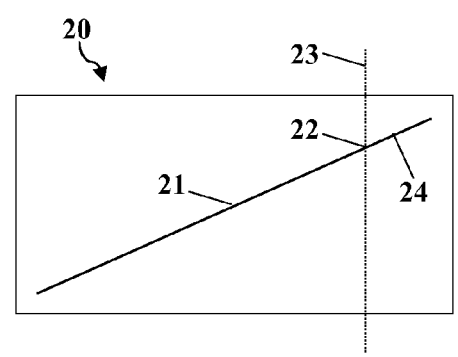

The present invention is best understood with reference to the attached drawings in which like numerals refer to like elements, and in which:

FIG. 1 illustrates a flow chart of an example data flow of the present invention;

Table 1 illustrates a data value outcome table for a combination of three possible dips and two azimuths;

FIG. 2 illustrates a 2-D viewing slice of a 3-D data set in a 0 degrees viewing-orientation (10) and a 90 degrees viewing-orientation (20);

Table 2 illustrates a table showing the results of a 2-D viewing slice of a 3-D data set in 5 different viewing-orientations: 0 degree, 90 degree, 180 degree, 270 degree, and 360 degree;

Table 3A illustrates a table showing the color bar (color look-up table) for the first azimuth direction in a 3-dip and 2-azimuth-direction presentation example;

Table 3B illustrates the color bar (color look-up table) for the second azimuth direction in the 3-dip and 2-azimuth-direction presentation example;

Table 4A illustrates the color look-up table for the first azimuth direction in a 4-dip and 4-azimuth-direction presentation example;

Table 4B illustrates the color look-up table for the second azimuth direction in the 4-dip and 4-azimuth-direction presentation example;

Table 4C illustrates the color look-up table for the third azimuth direction in the 4-dip and 4-azimuth-direction presentation example; and Table 4D illustrates the color look-up table for the fourth azimuth direction in the 4-dips and 4-azimuth-direction presentation example.

DETAILED DESCRIPTION OF THE INVENTION

The present invention includes a method for the presentation, assimilation and visualization of multiple characteristics of objects in and associated with large quantities of information from multidimensional data volumes. The method provides the use of color displays for displaying selected characteristics of geological features, and more particularly relates to a method for displaying multiple characteristics of multidimensional geoscience data and, more particularly, to the use of color displays in geoscience data representation in visualizing out-of-plane dip of features in a plane slice from a multidimensional data volume while simultaneously observing changes in out-of-plane dip. Additionally, other objects or features with the same or other characteristics can be displayed in the same image. Varying attribute values of one or more geological feature characteristics can be viewed in one display. Incorporating several attributes of objects in a display into a single image is more convenient relative to creating individual displays of separate characteristics. Other advantages of the invention will be readily apparent to person skilled in the art based on the following detailed description. To the extent that the following detailed description is specific to a particular embodiment or a particular use of the invention, this is intended to be illustrative and is not to be construed as limiting the scope of the invention.

FIG. 1 illustrates a flow chart of an example data flow of the present invention, comprising five steps. In the first step 100, a 3-D Data Set is input. Data from a multidimensional data set, for example, containing geological objects like bedding surfaces or volumes, are input. The 3-D data set contains one or more data values, or attributes, each associated with an x, y, and z location. Example data sets include geoscience attributes and/or geological attributes, such as bedding surfaces. In further examples, other attributes are chosen for display, including characteristics such as thickness, relative position, porosity, lithological attributes, petrophysical attributes, etc.

In the second step 200, data values are encoded with dip information from a plurality of orientations. Each data value in the data set is analyzed for its apparent dip from one or more of a plurality of relative orientations. In a 2-D example, the dip is determined at a first azimuth, say zero degrees, by evaluating other data values that surround the data value under analysis. For the data value under analysis, another dip is determined at a second azimuth orientation, say 90 degrees, in a similar manner. Ultimately, these steps are repeated for as many data values in the data set as desired. The magnitude and sign of the dip is incrementalized, or categorized, into a set of value ranges. In this two-azimuth example, sixteen different dip values would result in 256 dip-azimuth combinations. In a simple example, the dip values are incrementalized into one of three outcomes: negative, positive, and approximately zero dip. The approximately zero dip, being a threshold range representing essentially "flat," is an important petrological indicator. Given two orientations, zero (0) degrees azimuth and ninety (90) degrees azimuth, this combination of three possible dips and two azimuths results in nine possible outcomes, as shown in Table 1. For any given x, y, z point in a data cube, there is an apparent dip in the x and the y direction. The data set is transformed, or a new data set made, by assigning the outcome value for each data value under analysis.

In the third step 300, a color look-up table is provided that displays subsets of the outcomes for each orientation. A color is assigned at the x, y, z location to indicate the dip at that location. However, the dip and its resulting color depend on the relative viewing-orientation. A feature (such as a geologic bed) that appears flat in one direction could appear dipping in another direction. In geology, the "strike" direction is 90 degrees from the azimuth of maximum dip. In practice, displaying the dips of such geologic features at each x, y, and z location of the 3-D data set, many data values would need to be constantly re-computed in order to display the dip based upon the viewing-orientation. Such a configuration would require a large amount of memory and an extremely large number of high-speed computations. By using a different color look-up table for each orientation/azimuth, the dip information can be quickly displayed without use of additional 3-D data sets and without additional computation on the 3-D data set.

In the fourth step 400, the color look-up table to use is selected in response to the viewing-orientation of the data set. As a user rotates the display of the 3-D data set, moving from a first orientation to a second viewing-orientation, the color look-up table that is used is simply switched from one color look-up table to another color look-up table. The color look-up table is designed to be sensitive to the outcomes that are specific to its respective viewing orientation.

In the fifth step 500, the data set is displayed in a given orientation using the selected color look-up table that is appropriate for that given viewing-orientation.

It is noted that in further examples, the steps do not necessarily have to be performed in sequential order. For example, the viewing-orientation is first determined, resulting in provision or generation of a color look up table to use for display of the data set.

Table 1 illustrates an example data value outcome table for a combination of three possible dips and two azimuths, 0 degrees azimuth and 90 degrees azimuth, which results in nine possible outcomes.

TABLE 1

| Outcome | Dip at 0° Azimuth | Dip at 90° Azimuth |
| --- | --- | --- |
| 1 | −1 | −1 |
| 2 | −1 | 0 |
| 3 | −1 | +1 |
| 4 | 0 | −1 |
| 5 | 0 | 0 |
| 6 | 0 | +1 |
| 7 | +1 | −1 |
| 8 | +1 | 0 |
| 9 | +1 | +1 |

This is a generic table showing how a choice of three different dips and two viewing-orientations results in two color look-up tables (CLUTs), as will be shown in Table 3A and Table 3B. For a given x, y, z data point in the data set, using this dip incrementialization, there are one of three possible dips in the 0 degrees azimuth orientation and one of three possible dips in the 90 degrees azimuth orientation. For example, the data point can be: flat in both azimuthal directions, flat in one azimuthal direction and dipping up or dipping down in the other azimuthal direction, dipping up in both azimuthal directions, dipping up in one azimuthal direction and dipping down or dipping up in the other azimuthal direction, etc. This results in nine possible combinations or outcomes. Therefore, the color look-up table must be able to contain at least nine data values, one for each of the possible combinations. In this example, outcome data values 1, 2 and 3 represent a negative dip at 0 degrees azimuth, being a threshold range representing essentially "dipping down" while at the same time representing the three different possible dips that can occur at 90 degrees azimuth. Data value 1 represents a negative dip at 90 degrees azimuth, representing "dipping down". Data value 2 represents zero, being the threshold range representing "flat", at 90 degrees azimuth. Data value 3 represents a positive dip at 90 degrees azimuth, representing "dipping up".

FIG. 2 illustrates a 2-D viewing slice of a 3-D data set in a 0-degree viewing-orientation (10) and a 90-degree viewing-orientation (20). In the 0-degree viewing orientation (10), the geologic horizon (11) appears "flat" at the point of interest (12), which is denoted by the vertical line (13). The point of interest (12) is at the crest of an anticline (14). In the 90-degree viewing-orientation (20), the corresponding point of interest (22), denoted by the vertical line (23), reveals that the geologic horizon (21) is dipping in a monoclonal manner (24). The two viewing orientations (10 and 20) complete the interpretation of the geologic structure; the structure is a monoclonal dipping anticline (11 and 21). Color coding the anticline seen in the 0-degree viewing orientation (10) with information about the monoclonal dip that is seen in the 90-degree viewing orientation (20) results in greatly improved ability to rapidly interpret features appearing within the data volume. In this way, the dip information that is perpendicular to the plane being displayed is now viewable as color-coded information on the display. This color-coded information can be mixed with other attributes (such as amplitude, coherence, etc.) to enhance the interpretability of the display. In one example, hue defines in-plane dip, intensity defines amplitude, and saturation (grayness) defines coherence.

Table 2 illustrates a table showing the results of a 2-D viewing slice of a 3-D data set in five (5) different viewing-orientation: 0 degree, 90 degree, 180 degree, 270 degree, and 360 degree.

TABLE 2

| Azimuth | Dip | Color |
| --- | --- | --- |
| 0° = 360° | 0 = Flat | Grey |
| 90° | +1 = Dipping Up | Red |
| 180° | 0 = Flat | Grey |
| 270° | −1 = Dipping Down | Blue |

In an example, the data point shown in FIG. 2 is flat in the 0 degree, 180 degrees and 360 degrees azimuth orientations. However, the data point is dipping "up" in the 90 degrees azimuth orientation and is dipping "down" in the 270 degrees azimuth orientation. In the 0 degrees and 180 degrees azimuth, where the data point is "flat", a grey color can be assigned. In the 90 degrees azimuth, a red color can be assigned. In the 270 degrees azimuth, a blue color can be assigned to the data point.

Table 3A illustrates a color bar, color look-up table, for the first azimuth direction in a 3-dip and 2-azimuth-direction presentation example.

TABLE 3A

CLUT 1 for a 3-dip, 2-azimuth example (for 0° Azimuth)

| Data value | Dip | Color |
| --- | --- | --- |
| 1 | D | Blue |
| 2 | D | Blue |
| 3 | D | Blue |
| 4 | F | Gray |
| 5 | F | Gray |
| 6 | F | Gray |
| 7 | U | Red |
| 8 | U | Red |
| 9 | U | Red |

Based on this table, the data set is transformed (or a new data set generated) by assigning the outcome value for the data value under analysis. The data set is therefore encoded with dip information from a plurality of orientations. A color look-up table is used for each orientation. In this example, a first color look-up table is constructed for 0 degrees azimuth orientation and a second color look-up table for 90 degrees azimuth orientation. Color look-up table 1 provides three colors, for example: red for positive dip, gray for zero threshold dip, and blue for negative dip. For a given x, y, z data point in the data set, using this dip incrementialization, there are one of three possible dips in the 0 degrees azimuth orientation and one of three possible dips in the 90 degrees azimuth orientation. This results in nine possible combinations or outcomes. Therefore, the color look-up table must be able to contain at least nine data values, one for each of the possible outcomes. The first color look-up table, as shown in Table 3A, represents the extraction of the dip information for the first azimuth. For example, negative dip is assigned the color blue, positive dip assigned the color red and flat assigned the color grey. In Table 3A, data values 1, 2 and 3 represent a negative dip in first azimuth; values 4, 5, and 6 represent no dip, "flat", in the first azimuth direction; and values 7, 8, and 9 represent a positive dip in the first azimuth direction. These multiple values for a single dip value are required, as each carries the dip information for the second orientation.

Table 3B illustrates the color bar (color look-up table) for the second azimuth direction in a 3-dip and 2-azimuth-direction presentation example.

TABLE 3B

CLUT 2 for a 3-dip, 2-azimuth example for 90° Azimuth)

| Data value | Dip | Color |
|---|---|---|
| 1 | D | Blue |
| 2 | F | Gray |
| 3 | U | Red |
| 4 | D | Blue |
| 5 | F | Gray |
| 6 | U | Red |
| 7 | D | Blue |
| 8 | F | Gray |
| 9 | U | Red |

Values 1, 2, and 3, which for the first azimuth all represent a negative dip, now represent three different possible dips in the second azimuth direction. Data value 1 represents a negative dip in the second azimuth direction. A data value of 2 represents "flat" in the second azimuth direction and data value 3 represents a positive dip in the second azimuth direction. Therefore, the second color look-up table maps a blue color for data value 1, grey for data value 2, and red for data value 3.

This pattern is repeated for data value 4, 5, 6 and 7, 8, 9. In this way, a single data set can hold orientation-dependent information, enabling high-speed visualization of the orientation-changing data as the data set is rotated. By reducing the processing burden to simple swapping of the color look-up table, important geologic features (such as confirmation of 4-way dip closures) can be spontaneously analyzed by the interpreter. To further illustrate as the data set is rotated, the appropriate color look-up table is applied in response to the viewing-orientation of the data set. The data set is displayed using the selected color look-up table, allowing the user to see changes in color in response to orientation-dependent changes in the dip (or other orientation-dependent attribute).

In one example, additional color look-up tables are constructed for azimuth directions that are 180 degrees from the encoded azimuth directions. In such example, a 180 degrees azimuth color look-up table is based upon the 0 degrees azimuth color look-up table, but reverses the polarity of the dip in the assignment of colors. A 180 degrees azimuth color look-up table would simply reverse a blue color occurring in the 0 degrees azimuth color look-up table into a red color in the 180 degrees azimuth color look-up table. In this way, the number of azimuth orientations that are encoded into data set are reduced in half. In one example, the number of required data outcomes is reduced by a factor of 81.

Table 4A illustrates the color look-up table for the first azimuth direction in a 4-dip and 4-azimuth-direction presentation example.

TABLE 4A

CLUT for 1st Azimuth 4-dip, 4-azimuth example

| data value | color value |
|---|---|
| 0-63 | color chosen for dip 1 |
| 64-127 | color chosen for dip 2 |
| 128-191 | color chosen for dip 3 |
| 192-255 | color chosen for dip 4 |

A 4-azimuth and 4-dip combination requires at least 256 data values, only one byte for each data value. In Table 4A, for the first azimuth direction (0 degree), the first sixty-four data values (0-63) represent the first dip value in the first azimuth. Likewise, the next sixty-four data values (64-127) represent the second dip value. The third quarter of data values (128-191) represents the third dip value. The final quarter of data values (192-255) represent the fourth dip value. Therefore, when using this color look-up table for a first viewing-orientation, any data value from (0 to 63) will indicate a first dip value by displaying the color associated with that first dip value.

Table 4B illustrates the color look-up table for the second azimuth direction in a 4-dip and 4-azimuth-direction presentation example.

FIG. 4B

CLUT for 2nd Azimuth 4-dip, 4-azimuth example

| Data Value | Color Value |
|---|---|
| 0-15 | color chosen for dip 1 |
| 64-79 | color chosen for dip 1 |
| 128-143 | color chosen for dip 1 |
| 192-207 | color chosen for dip 1 |
| 16-31 | color chosen for dip 2 |
| 80-95 | color chosen for dip 1 |
| 144-159 | color chosen for dip 2 |
| 208-223 | color chosen for dip 2 |
| 32-47 | color chosen for dip 3 |
| 96-111 | color chosen for dip 3 |
| 160-175 | color chosen for dip 3 |
| 224-239 | color chosen for dip 3 |
| 48-63 | color chosen for dip 4 |
| 112-127 | color chosen for dip 4 |
| 176-191 | color chosen for dip 4 |
| 240-255 | color chosen for dip 4 |

In Table 4B, the first quarter of the data values of each quarter (0-15) (64-79) (128-143) (192-207) represent the first dip value in the second azimuth direction. As illustrated in the color look-up table, the pattern is repeated for dips 2, 3, and 4.

Table 4C illustrates the color look-up table for the third azimuth direction in a 4-dip and 4-azimuth-direction presentation example.

TABLE 4C

CLUT for 3rd Azimuth 4-dip, 4-azimuth example

| data value | color value |
|---|---|
| 0-3 | color chosen for dip 1 |
| 64-67 | color chosen for dip 1 |
| 128-131 | color chosen for dip 1 |
| 192-195 | color chosen for dip 1 |
| 16-19 | color chosen for dip 1 |
| 80-83 | color chosen for dip 1 |
| 144-147 | color chosen for dip 1 |
| 208-211 | color chosen for dip 1 |
| 32-35 | color chosen for dip 1 |
| 96-99 | color chosen for dip 1 |
| 160-163 | color chosen for dip 1 |
| 224-227 | color chosen for dip 1 |
| 48-51 | color chosen for dip 1 |
| 112-115 | color chosen for dip 1 |
| 176-179 | color chosen for dip 1 |
| 240-243 | color chosen for dip 1 |
| 4-7 | color chosen for dip 2 |
| 68-71 | color chosen for dip 2 |
| 132-135 | color chosen for dip 2 |
| 196-199 | color chosen for dip 2 |
| 20-23 | color chosen for dip 2 |
| 84-87 | color chosen for dip 2 |
| 148-151 | color chosen for dip 2 |
| 212-215 | color chosen for dip 2 |
| 36-39 | color chosen for dip 2 |
| 100-103 | color chosen for dip 2 |
| 164-167 | color chosen for dip 2 |
| 228-231 | color chosen for dip 2 |

TABLE 4C-continued

CLUT for 3rd Azimuth 4-dip, 4-azimuth example

| data value | color value |
|---|---|
| 52-55 | color chosen for dip 2 |
| 116-119 | color chosen for dip 2 |
| 180-183 | color chosen for dip 2 |
| 244-247 | color chosen for dip 2 |
| 8-11 | color chosen for dip 3 |
| 72-75 | color chosen for dip 3 |
| 136-139 | color chosen for dip 3 |
| 200-203 | color chosen for dip 3 |
| 24-27 | color chosen for dip 3 |
| 88-91 | color chosen for dip 3 |
| 152-155 | color chosen for dip 3 |
| 216-219 | color chosen for dip 3 |
| 40-43 | color chosen for dip 3 |
| 104-107 | color chosen for dip 3 |
| 168-171 | color chosen for dip 3 |
| 232-235 | color chosen for dip 3 |
| 56-59 | color chosen for dip 3 |
| 120-123 | color chosen for dip 3 |
| 184-187 | color chosen for dip 3 |
| 248-251 | color chosen for dip 3 |
| 12-15 | color chosen for dip 4 |
| 76-79 | color chosen for dip 4 |
| 140-143 | color chosen for dip 4 |
| 204-207 | color chosen for dip 4 |
| 28-31 | color chosen for dip 4 |
| 92-95 | color chosen for dip 4 |
| 156-159 | color chosen for dip 4 |
| 220-223 | color chosen for dip 4 |
| 44-47 | color chosen for dip 4 |
| 108-111 | color chosen for dip 4 |
| 172-175 | color chosen for dip 4 |
| 236-239 | color chosen for dip 4 |
| 60-63 | color chosen for dip 4 |
| 124-127 | color chosen for dip 4 |
| 188-191 | color chosen for dip 4 |
| 252-255 | color chosen for dip 4 |

Table 4C likewise shows the pattern for displaying the dip in the third azimuth direction. The first quarter of the first quarter of the data values of each quarter (0-3) (64-67) (128-131) (192-195) (16-19) (80-83) (144-147) (208-211) (32-35) (96-99) (160-163) (224-227) (48-51) (112-115) (176-179) (240-243) represent the first dip value in the third azimuth direction. As illustrated in the color look-up table, the pattern is repeated for dips 2, 3, and 4.

table 4D illustrates the color look-up table for the fourth azimuth direction in a 4-dip and 4-azimuth-direction presentation example.

TABLE 4D

CLUT for 4th Azimuth 4-dip, 4-azimuth example

| data value | color value |
|---|---|
| 0, 4, 8, . . . , 252 | color chosen for dip 1 |
| 1, 5, 9, . . . , 253 | color chosen for dip 2 |
| 2, 6, 10, . . . , 254 | color chosen for dip 3 |
| 3, 7, 11, . . . , 255 | color chosen for dip 4 |

In Table 4D, every fourth data value starting with 0 represents the first dip value in the fourth azimuth direction. Likewise, every fourth data value starting with data value 1 represents the second dip value in the fourth azimuth direction. The pattern is repeated for dips 3 and 4. In this example, the first azimuth direction is referenced as 0 degree, the second azimuth direction is 45 degrees rotating from the first azimuth direction, the third azimuth direction is 90 degree, and the fourth azimuth direction is 135 degree. In one example, four additional color look-up tables are created from these first four-color look-up tables. The fifth color look-up table, for a fifth azimuth direction of 180 degrees from the first azimuth direction, simply reverses the dip values, such that the color value for dip 1 is replaced with the color value for dip 4, the color value for dip 2 is replaced with the color value of dip 3, the color value of dip 3 is replaced with the color value of dip 2, and the color value of dip 4 is replaced with the color value of dip 1. The sixth color look-up table for a 225 degrees azimuth, uses color look-up table two, and reverses the dip values in a like manner. A seventh color look-up table, for a 270 degrees azimuth, uses color look-up table three and reverses the dip values in a like manner. The eight-color look-up table, for 315 degrees azimuth, uses color look-up table four and reverses the dip values in a like manner.

The foregoing disclosure is presented for purposes of illustration and description, and is not intended to limit the invention to the forms disclosed herein. Consequently, variations and modifications commensurate with the above disclosures and the disclosure of the relevant art are within the spirit of the invention. Such variations will readily suggest themselves to those skilled in the relevant art. Further, the examples described are also intended to explain the best mode for carrying out the invention, and to enable others skilled in the art to utilize the invention and such or other embodiments and with various modifications required by the particular applications or uses of the invention. It is intended that the appended claims be construed to include alternative embodiments to the extent that is permitted by prior art.

I claim:

1. A method for visualization of orientation dependent data in a data set comprising:
    categorizing an orientation dependent data attribute into two or more classes;
    categorizing a viewing orientation into two or more classes;
    establishing a color lookup table on a computer programmed to produce images representative of the data set for each of the two or more viewing-orientation classes, the two or more color lookup tables each having a lookup value for each combination of orientation-dependent class and viewing-orientation class;
    assigning a lookup value to at least one data value in the data set, the lookup value corresponding to the classified orientation-dependent data attributes for the data value;
    selecting an established color lookup table from the two or more color lookup tables in response to a viewing orientation of the data set; and
    forming a display from the assigned lookup value using the selected color lookup table.

2. The method of claim 1 wherein the data set is a geosciences attribute.

3. The method of claim 1 wherein the orientation dependent data attribute is apparent dip.

4. The method of claim 1 wherein the orientation dependent data attribute is a geologic feature.

5. The method of claim 1 wherein the orientation dependent data attribute is bedding curvature.

6. The method of claim 1 wherein the orientation dependent data attribute is coherence.

7. The method of claim 1 wherein the orientation dependent data attribute is information from pre-stack seismic data.

8. The method of claim 1 wherein the orientation dependent data attribute is a geologic interpretation.

9. In a computer programmed to produce images representative of a data set, an article of manufacture comprising:

a non-transitory medium that is readable by a computer and that carries instructions for said computer to perform a process comprising:

categorizing an orientation dependent data attribute into two or more classes;

categorizing a viewing orientation into two or more classes;

establishing a color lookup table for each of the two or more viewing-orientation classes, the two or more color lookup tables each having a lookup value for each combination of orientation-dependent class and viewing-orientation class;

assigning a lookup value to at least one data value in the data set, the lookup value corresponding to the classified orientation-dependent data attributes for the data value;

selecting an established color lookup table from the two or more color lookup tables in response to a viewing orientation of the data set; and displaying from the computer the assigned lookup value using the selected color lookup table.

10. The article of manufacture of claim 9 wherein the data set is a geosciences attribute.

11. The article of manufacture of claim 9 wherein the orientation dependent data attribute is apparent dip.

12. The article of manufacture of claim 9 wherein the orientation dependent data attribute is a geologic feature.

13. The article of manufacture of claim 9 wherein the orientation dependent data attribute is bedding curvature.

14. The article of manufacture of claim 9 wherein the orientation dependent data attribute is coherence.

15. The article of manufacture of claim 9 wherein the orientation dependent data attribute is information from prestack seismic data.

16. The article of manufacture of claim 9 wherein the orientation dependent data attribute is a geologic interpretation.

17. A method for displaying multiple characteristics of a multidimensional geoscience data volume in one presentation comprising:

selecting an orientation dependent attribute;

selecting two or more orientations for use in displaying the attribute;

categorizing values of the attribute into two or more categories;

establishing a color look-up table for each selected orientation, comprising assigning a state value in the color lookup table for each unique combination of selected orientation and attribute category; and assigning a color to each state value in the color lookup table, based upon the selected orientation for the color look-up table and the attribute category for that state value;

placing color lookup table state values in a multidimensional data volume, each state value representing a unique combination of orientation-dependent states for that attribute value at that location in the volume;

setting a viewing orientation of the data volume;

selecting a color look-up table from the established color look-up tables based on the set viewing orientation;

displaying a portion of the data volume using the selected color lookup table;

changing the viewing orientation of the data volume;

displaying the portion of the data volume using a color look-up table selected from the established color lookup tables based on the changed viewing orientation; and wherein the steps of displaying are performed on a computer programmed to produce images representative of the data volume.

18. The method of claim 17 wherein the orientation dependent data attribute is apparent dip.

19. The method of claim 17 wherein the orientation dependent data attribute is bedding curvature.

20. The method of claim 17 wherein the orientation dependent data attribute is coherence.

* * * * *